D. L. POTTER.
TOOL FOR DRESSING FISH, &c.
APPLICATION FILED MAY 5, 1915.
1,171,241.
Patented Feb. 8, 1916.
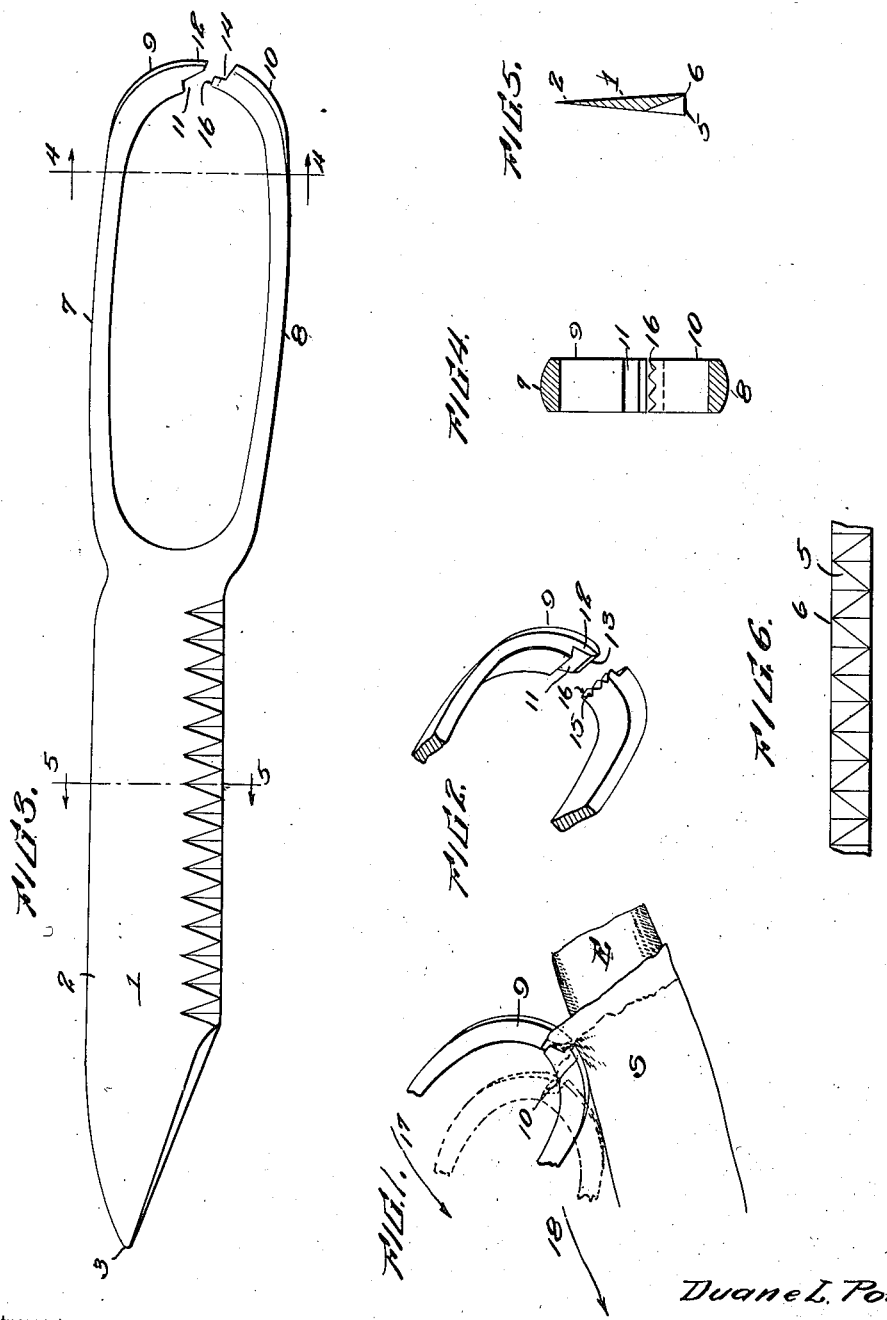

UNITED STATES PATENT OFFICE.

DUANE L. POTTER, OF SCRANTON, PENNSYLVANIA.

TOOL FOR DRESSING FISH, &c.

1,171,241.  Specification of Letters Patent.  Patented Feb. 8, 1916.

Application filed May 5, 1915. Serial No. 26,052.

*To all whom it may concern:*

Be it known that I, DUANE L. POTTER, a citizen of the United States, residing at Scranton, in the county of Lackawanna and State of Pennsylvania, have invented certain new and useful Improvements in Tools for Dressing Fish, &c.; and I do hereby declare the following to be a full, clear, and exact description of the invention, such as will enable others skilled in the art to which it appertains to make and use the same.

This invention relates to butchering, and more especially to dressing; and the object of the same is to produce a tool particularly adapted for dressing fish and skinning eels, hogs, etc. This object is carried out in the manner hereinafter fully described and claimed and as shown in the drawings wherein:

Figure 1 is a side elevation illustrating the manner of using this tool for skinning an eel. Fig. 2 is a perspective detail of the jaws open. Fig. 3 is a side elevation of the complete tool. Figs. 4 and 5 are sections on the lines 4—4 and 5—5 respectively of Fig. 3, and Fig. 6 is an enlarged edge view of the fish scaler.

It is well known to those who dress fish and the like that some require scaling and some skinning, that it is particularly difficult to remove the skin from an eel, and that in any case a cutting edge and often a point is desirable on the dressing tool.
My present invention is designed for the use of those engaged in this business, and it is my intention to produce a single implement which will meet all their wants. To this end I make the tool of metal and preferably of high grade steel, having a blade 1 at one end with a sharp cutting edge 2 and preferably pointed at its extremity as at 3. The body of the blade is quite thick at its back as seen in section at Fig. 5, and its rear edge is serrated on zig-zag lines as shown at 4, the edges of the serrations standing in a single plane and being sharpened as at 5. Where these lines meet each other sharp corners 6 are produced which are coincident with the plane faces of the blade 1, and these corners and the cutting edges 5 I find to be extremely serviceable in scaling fish.

The shank end of the blade merges into two arms 7 and 8 which are tempered so teeth 16 which come in contact with the outer side of the skin are obviously useful for gripping it where it is most slimy.

While I have thus described in detail the uses of this tool for treating fish and eels, I do not wish to be limited in that respect as it is obviously a handy tool for butchering, dressing, and treating other meat; and I have found it quite useful with hogs for instance, the point 3 being for sticking purposes, and the shape of the blade especially adapted for dressing the head and feet, taking out cords for gambrel, opening the carcass, and otherwise.

What I claim is:

1. A tool for skinning eels, etc., comprising two jaws, one jaw being recessed on its inner side and its outer side extended into a lip and the other jaw being recessed on its outer side to receive said lip and having its inner projecting side toothed to enter the recess of the first-named jaw, and means for supporting the jaws and moving them relatively to each other.

2. A tool for skinning eels, etc., comprising two arms having their ends turned inward into jaws, the upper jaw being recessed on its inner side and having its outer side extended into a lip provided with a sharp cutting edge, and the lower jaw being recessed on its outer side to receive said lip and having its inner side notched longitudinally of the tool to produce upstanding teeth adapted to enter said recess in the other jaw.

3. A tool for skinning eels, etc., comprising a loop-shaped handle consisting of two arms connected at one end and having their other ends disconnected and turned inward into jaws, one jaw being recessed on its inner side and its outer side extended into a lip provided with a sharp edge and the other jaw being recessed on its outer side to receive said lip when the jaws are pressed together.

4. A tool for skinning eels, etc., comprising a loop-shaped handle consisting of two arms connected at one end and having their other ends disconnected and turned inward into jaws, one jaw being recessed on its inner side and its outer side extended into a lip and the other jaw being recessed on its outer side to receive said lip and having its inner projecting side toothed to enter the recess of the first-named jaw.

5. A tool for skinning eels, etc., comprising a loop-shaped handle consisting of two arms integrally connected at one end and having their other ends disconnected and turned inward into jaws, the upper jaw being recessed on its inner side and having its outer side extended into a lip provided with a sharp cutting edge, and the lower jaw being recessed on its outer side to receive said lip and having its inner side notched longitudinally of the tool to produce upstanding teeth adapted to enter said recess in the other jaw when the handle is compressed, for the purpose set forth.

In testimony whereof I affix my signature in presence of two witnesses.

DUANE L. POTTER.

Witnesses:
 MARY DUFFY,
 MARY COYLE.